United States Patent [19]
Bondybey et al.

[11] 3,974,016
[45] Aug. 10, 1976

[54] BONDING OF THERMOPLASTIC COATED CYLINDERS

[75] Inventors: Vladimir Edmund Bondybey, Fanwood; Arthur Haines Fitch, Berkeley Heights, both of N.J.

[73] Assignee: Bell Telephone Laboratories, Incorporated, Murray Hill, N.J.

[22] Filed: Nov. 4, 1974

[21] Appl. No.: 520,610

[52] U.S. Cl. .............................. 156/272; 156/47; 156/290; 156/306; 219/121 LM; 428/36; 428/374
[51] Int. Cl.² .................... B32B 31/20; B32B 31/04
[58] Field of Search .............. 156/47, 72, 306, 433, 156/290; 219/121 LM, 121 L; 428/374

[56] References Cited
UNITED STATES PATENTS

| | | | |
|---|---|---|---|
| 2,749,261 | 6/1956 | Hardison | 156/47 |
| 3,316,134 | 4/1967 | Durakis et al. | 156/47 |
| 3,560,291 | 2/1971 | Foglia et al. | 219/121 LM |
| 3,585,350 | 6/1971 | Voytko | 219/121 LM |
| 3,588,440 | 6/1971 | Morse | 219/121 LM |
| 3,626,143 | 12/1971 | Fry | 219/121 LM |

*Primary Examiner*—Edward G. Whitby
*Attorney, Agent, or Firm*—A. N. Friedman

[57] ABSTRACT

A cylindrical strand with a thermoplastic outer shell (e.g., plastic insulated wire) is bonded along its length to a similar or different cylindrical strand by laser heating. The strands are brought into contact with one another at a contact point. A laser beam of selected power and wavelength is directed at the contact point in a direction approximately parallel to the axis of the strands as the strands are carried past this point. Absorption of the light by the plastic causes melting sufficient to produce bonding. The depth of penetration of the thermal energy into the plastic is controlled by selection of the wavelength of the laser radiation relative to the absorption spectrum of the thermoplastic material. The laser power level is adjusted to control the total energy input in accordance with the strand feed rate.

7 Claims, 6 Drawing Figures

3,974,016

BONDING OF THERMOPLASTIC COATED CYLINDERS

BACKGROUND OF THE INVENTION

1. Field of the Invention

The invention is in the field of the production of transmission media, both electrically conductive (e.g., wires) and nonconductive (e.g., optical waveguides).

2. Brief Description of the Prior Art

A technique which has been used to join plastic coated wires into flat cables involves the passage of the individual wires on either side of a heated blade to produce localized melting of the thermoplastic jacket. The wires are then pressed together to form the desired bond (U.S. Pat. No. 2,749,261 issued on Mar. 30, 1953). While well suited to many ranges of use, this method has limitations as one wishes to bond wires of smaller size and at faster feed rates. At smaller wire sizes, the mechanical and thermal design of the blade becomes more difficult. At higher feed rates it is necessary to operate the blade at higher temperatures in order to increase the rate of flow of thermal energy. For any given thermoplastic material there is an upper limit to the usable blade temperature because of deterioration of the material.

SUMMARY OF THE INVENTION

It has been found that the use of a laser beam in the bonding of cylindrical strands, possessing a thermoplastic outer shell, offers versatility and controllability of a type not possessed by prior art methods. In this method two or more strands are continuously fed into a fixture which brings them into contact and holds them together as a laser beam is directed at each point of contact. The wavelength of laser radiation is selected to correspond with an absorption frequency of the thermoplastic material being bonded. Absorption of the laser beam energy by the plastic produces the desired melting and bonding. The magnitude of the absorbance at the selected wavelength determines the depth of penetration of the laser radiation into the body of the plastic. The power level of the laser beam is adjusted with respect to the magnitude of absorbance and the strand feed rate to get the desired bonding with a minimum of deterioration of the plastic. The laser beam can be focused down to an almost arbitrarily small size to accommodate the bonding of small strands. The laser beam is directed approximately parallel to the length of the strands being bonded in order to make efficient use of the laser power. Many commercially important plastics absorb strongly in the range of infrared radiation produced by $CO_2$ and CO lasers. Plastic jacketed metallic conductors and plastic jacketed glass optical transmission fibers have been bonded using this method.

DETAILED DESCRIPTION OF THE INVENTION

The Method

Figure 1:
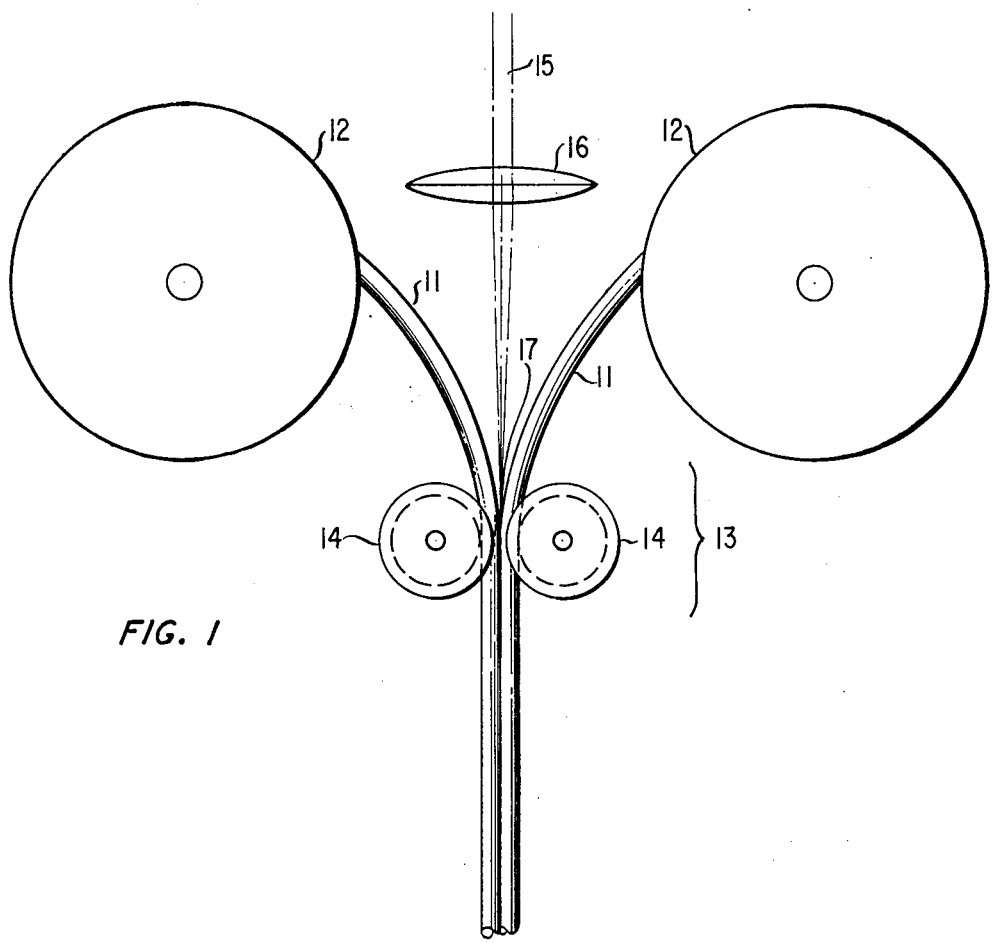
FIG. 1 is a plan view of an exemplary bonding apparatus.
Figure 6:
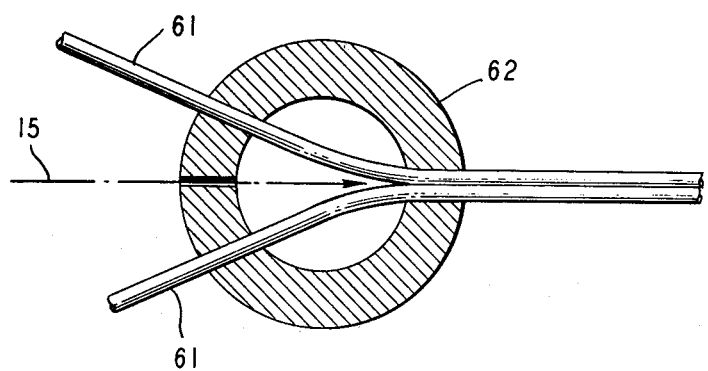
FIG. 6 is a plan view in section of an exemplary bonding apparatus.

FIG. 1 shows an exemplary apparatus for the continuous laser bonding of thermoplastic jacketed strands. In this apparatus the strands 11, either as individual strands or as already bonded groups of strands are fed from source spools 12 into a fixture 13 which brings them together and holds them together for bonding. The fixture 13 is illustrated as a pair of groove rollers 14. This is only one of many possible types of fixtures, including tha illustrated in FIG. 6. In FIG. 6 the strands 61 are guided by holes drilled in a piece of metal 62.

The thermal energy needed for bonding is supplied by a laser beam 15 (FIG. 1) which is directed to strike the point of contact 17 of the strands 11. The beam is focused, if necessary, by a lens 16. As it strikes the point of contact the beam is generally parallel to the axis of the strands to make most efficient use of the beam power. However, if the geometry of the fixture requires, the direction of incidence of the laser beam can be as much as approximately 30° from the axis of the strands without inordinately large power loss. The laser radiation is absorbed by the thermoplastic material producing thermal energy which produces sufficient melting and plastic flow to produce the desired bonding. For best energy efficiency, the focused size of the laser beam is adjusted to be approximately equal to the size 21 of the desired bond (see FIG. 2). The fixture 13 is designed to hold the strands together until the melted plastic has had time to cool enough to develop sufficient bond strength to withstand further handling.

Figure 2:
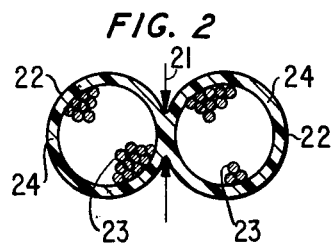
FIG. 2 is an elevational view in section of a bonded pair of plastic jacketed multistrand wires.
Figure 3:
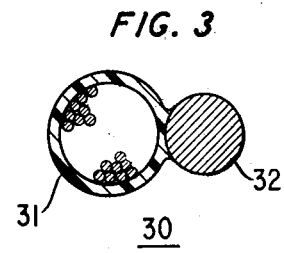
FIG. 3 is an elevational view in section of a plastic jacketed multistrand conducting wire bonded to a bare metallic wire.
Figure 4:
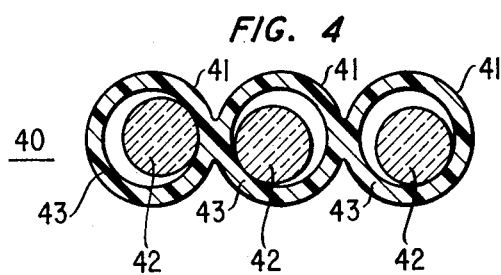
FIG. 4 is an elevational view in section of a triad of plastic jacketed glass fibers bonded to form a flat cable.

FIG. 2 shows two bonded strands 22 of multistrand copper wire 23 with a thermoplastic insulating jacket 24. During bonding the thermoplastic material was heated enough to produce plastic flow and the desired filet size 21. In FIG. 3 laser bonding has been used to bond a plastic jacket multistrand conductor 31 to a bare metallic wire 32. In such a pair 30 a steel wire 32 can be used to give mechanical support to a mechanically weaker wire 31. FIG. 4 shows a flat cable 40 composed of three strands 41 of loosely clad glass transmission line. The light conducting glass fibers 42 fit loosely inside a thermoplastic jacket 43. The three jackets 43 are bonded simultaneously in one bonding operation or are sequentially bonded in two bonding operations to form the desired flat cable. In this usage it is important that the bonding be accomplished with as little damage as possible to the inner surface of the thermoplastic jackets 43. Cylindrical strands of other cross sectional shapes are also bondable by this technique.

Figure 5:
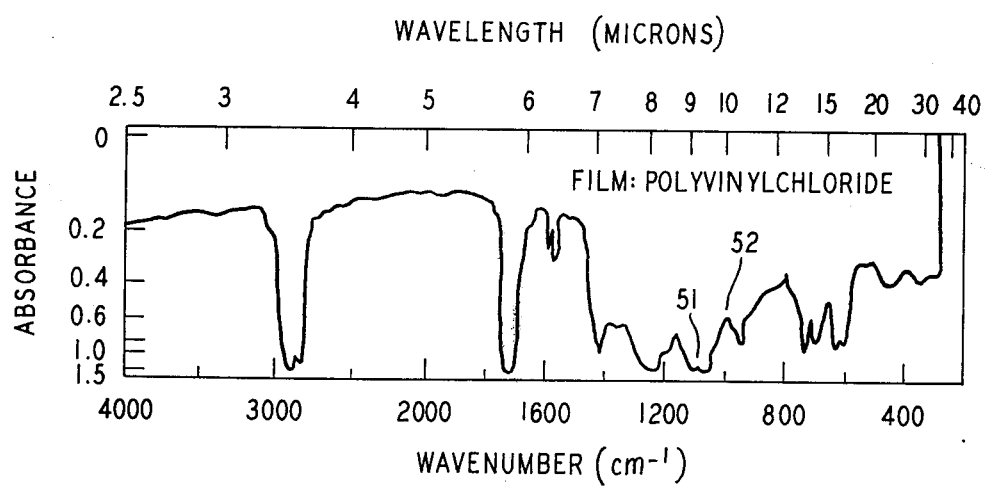
FIG. 5 is a curve showing the absorbance of an exemplary plasticized polyvinyl chloride as a function of the wavelength of incident electromagnetic energy.

Several commercially important thermoplastic polymer compositions possess sufficient absorption in the infrared region of the electromagnetic spectrum to be bonded using lasers operating in that spectral region. FIG. 5, for example, shows the absorption spectrum of a plasticized polyvinyl chloride composition. This spectrum shows significant absorption in, for example, the 9 to 11 micrometer wavelength region available from $CO_2$ lasers and the 4.9 to 6.4 micrometer wavelength region available from CO lasers. In selecting wavelengths, for example, the $CO_2$ laser band, the selection of a frequency exhibiting higher absorbance 51 will produce shallower heating of the polymeric material than a laser operating at a frequency 52 at which the polymer possesses a lower absorbance. This property, characteristic of light absorption in polymers, permits the worker more freedom in tailoring the bonding properties to the use envisioned and to the thickness of the polymeric jacket.

Sensitive and essentially instantaneous adjustment of laser beam power can be accomplished, for example, by adjusting the power input to the laser or mechanical adjustment of a diaphragm defining the diameter of the laser beam. The laser power level is adjusted in accordance with the desired depth of heating and the strand feed velocity. The laser power level is adjusted to heat the thermoplastic material enough to produce bonding by plastic flow of the softened or melted polymeric material. Higher mechanical bond strength is achieved when there is sufficient melting of the polymeric material to result in the formation of a good filet. Some uses require less bond strength which can be achieved, for example, by periodic interruption of the laser beam to produce bonded lengths of strand separated by unbonded lengths of strand. A $CO_2$ laser output of 100 watts is capable of bonding two 0.05 inch OD polyvinyl chloride jacketed wires at a rate of the order of 300 meters per minute. Since the energy of the laser beam is converted to heat directly within the thermoplastic material the feed rate is limited by the available laser power not by heat flow considerations involved in a heated blade technique.

Direction of the laser beam parallel to the axis of the strands in the neighborhood of the point of contact makes most efficient use of the laser power output because there will be continual light absorption for some distance down the length of the strand. However, if the geometry of the fixture requires, for example, if more than 2 strands are being simultaneously bonded, deviation of the beam by as much as 30° from the axis strand does not produce inordinate power loss.

The focusing capabilities of the laser beam permit the bonding of very small strands, including strands less than 500 micrometers in diameter, which are exceedingly difficult to bond using prior art techniques.

EXAMPLES

The bonding of two insulated conducting wires with an insulating jacket of a plasticized Nylon-11 and similar wires with a jacket of a polypropylene-polyethelyne copolymer both with a jacket outside diameter of 0.9 mm were bonded at a rate of approximately 80 meters per minute with a $CO_2$ laser operating at a wavelength of 10.6 micrometers and a power level of approximately 150 watts. A pair of conducting wires insulated with poly (vinyl chloride) with an outer diameter of 1.3 mm was bonded at rates of from 2 to 10 cm per minute using a 1 watt $CO_2$ laser at 10.6 micrometers. Pairs of light conducting glass fibers loosely fitting inside jackets of per fluorinated alkoxy with an outside diameter of 300 micrometers and a wall thickness of 50 micrometers have been bonded with a $CO_2$ laser operating at a wavelength of 10.6 micrometers and a power level of approximately one-half watt at a typical bonding speed of 12 centimeters per minute. The laser beam wavelength and power level are selected so as to produce good bonding with no significant deterioration of the inner surface of the polymeric jacket.

What is claimed is:

1. Method of bonding at least two flexible cylindrical bodies to one another comprising feeding the bodies, at least one of which bodies comprises a cylindrical outer region consisting of a thermoplastic polymeric composition and a cylindrical inner region including a non-polymeric material, individually from body sources and guiding the bodies into contact with one another at one contact point for each pair of contacting surfaces, which contact point remains approximately stationary as the bodies are being transported longitudinally past the contact point characterized in that a laser beam of selected wavelength is directed at each contact point and directed approximately parallel to the axis of the bodies, which laser beam provides localized heating in the region of the contact point sufficient to produce bonding by plastic flow of the thermoplastic polymer.

2. A method of claim 1 in which two bodies are bonded to one another.

3. A method of claim 1 in which the bodies are similar to one another.

4. A method of claim 1 in which the laser beam is intermittent, producing bonded lengths separated by unbonded lengths.

5. A method of claim 1 in which inner region of at least one of the bodies includes a continuous metallic electrically conductive path.

6. A method of claim 1 in which the inner region of at least one of the bodies includes a light transmissive glass fiber.

7. A method of claim 1 in which at least one of the bodies has a diameter of less than 500 micrometers.

* * * * *